United States Patent
Etzbach et al.

(10) Patent No.: US 11,932,219 B2
(45) Date of Patent: Mar. 19, 2024

(54) CONTROL DEVICE AND METHOD FOR CONTROLLING AN ACTUATOR FOR ACTUATING BRAKING MEANS OF A VEHICLE, MORE PARTICULARLY OF A RAIL VEHICLE

(71) Applicant: KNORR-BREMSE Systeme für Schienenfahrzeuge GmbH, Munich (DE)

(72) Inventors: Andrea Etzbach, Munich (DE); Markus Boxhammer, Munich (DE); Benjamin Heckmann, Poing (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 673 days.

(21) Appl. No.: 17/059,571

(22) PCT Filed: May 6, 2019

(86) PCT No.: PCT/EP2019/061494
§ 371 (c)(1),
(2) Date: Nov. 30, 2020

(87) PCT Pub. No.: WO2019/228757
PCT Pub. Date: Dec. 5, 2019

(65) Prior Publication Data
US 2021/0213928 A1 Jul. 15, 2021

(30) Foreign Application Priority Data
May 29, 2018 (DE) .......................... 102018112 846

(51) Int. Cl.
*B60T 8/00* (2006.01)
*B60T 8/17* (2006.01)
(Continued)

(52) U.S. Cl.
CPC .......... *B60T 17/228* (2013.01); *B60T 8/1705* (2013.01); *B60L 2240/423* (2013.01);
(Continued)

(58) Field of Classification Search
CPC ............ B60L 2240/423; B60T 13/662; B60T 13/665; B60T 17/228; B60T 2210/12; B60T 2270/413; B60T 8/1705; B60T 8/00
(Continued)

(56) References Cited

U.S. PATENT DOCUMENTS 5,286,096 A * 2/1994 Ferri ...................... B60T 13/665
  303/15
5,774,821 A * 6/1998 Eckert ................. B60W 40/064
  701/72
(Continued)

FOREIGN PATENT DOCUMENTS

| DE | 102011006002 A1 | 9/2012 |
|---|---|---|
| DE | 102013201623 A1 | 7/2014 |

(Continued)

OTHER PUBLICATIONS

International Search Report corresponding to PCT/EP2019/061494, dated Jul. 9, 2019.

*Primary Examiner* — Jonathan L Sample
(74) *Attorney, Agent, or Firm* — Barnes & Thornburg LLP

(57) ABSTRACT

The invention relates to a control device and a method for controlling at least one actuator for actuating braking means of a vehicle. A contact variable control system forms an inner control circuit, wherein the braking torque control system is arranged in a braking torque control unit embodied separately or in a separate location from the contact variable control unit and forms an outer control circuit.

11 Claims, 2 Drawing Sheets

(51) Int. Cl.
  *B60T 17/22* (2006.01)
  *B60T 13/66* (2006.01)
(52) U.S. Cl.
  CPC ......... *B60T 13/662* (2013.01); *B60T 2210/12* (2013.01); *B60T 2270/413* (2013.01)
(58) Field of Classification Search
  USPC ..................................................... 701/19, 20
  See application file for complete search history.

(56) References Cited

U.S. PATENT DOCUMENTS

| | | | | | |
|---|---|---|---|---|---|
| 5,788,339 | A | * | 8/1998 | Wood | B60T 8/1893 303/7 |
| 2008/0116739 | A1 | * | 5/2008 | Lang | B60T 8/1705 303/15 |
| 2009/0057072 | A1 | * | 3/2009 | Wood | B60T 17/228 188/34 |
| 2012/0018260 | A1 | * | 1/2012 | Nock | B60T 8/52 701/19 |
| 2013/0261924 | A1 | * | 10/2013 | Herden | B60T 8/1761 701/81 |
| 2013/0338860 | A1 | * | 12/2013 | Herden | B61H 9/00 701/20 |
| 2015/0134157 | A1 | * | 5/2015 | Aurich | B60T 13/665 701/20 |
| 2015/0367822 | A1 | * | 12/2015 | Jennek | B60T 17/228 701/70 |
| 2015/0367826 | A1 | * | 12/2015 | Bildstein | F16D 55/2245 303/10 |
| 2015/0375763 | A1 | * | 12/2015 | Bildstein | B61H 15/0007 188/71.9 |
| 2018/0194233 | A1 | * | 7/2018 | Müller | B60L 7/18 |
| 2018/0354479 | A1 | * | 12/2018 | Mauder | B60T 13/683 |

FOREIGN PATENT DOCUMENTS

| | | |
|---|---|---|
| DE | 102015110053 A1 | 12/2016 |
| DE | 102017211995 A1 | 1/2019 |
| EP | 1874601 A1 | 1/2008 |
| EP | 2890596 A1 | 7/2015 |

* cited by examiner

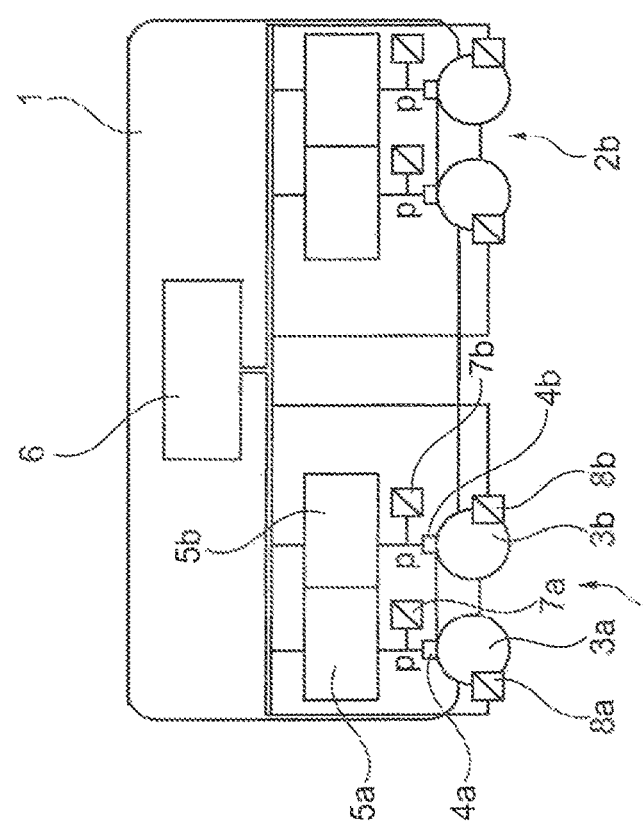
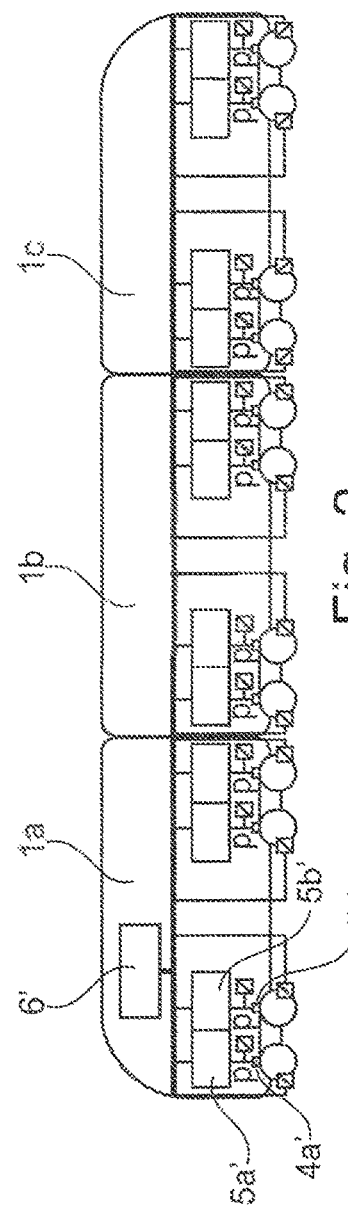

_US 11,932,219 B2_

CONTROL DEVICE AND METHOD FOR CONTROLLING AN ACTUATOR FOR ACTUATING BRAKING MEANS OF A VEHICLE, MORE PARTICULARLY OF A RAIL VEHICLE

CROSS REFERENCE AND PRIORITY CLAIM

This patent application is a U.S. National Phase of International Patent Application No. PCT/EP2019/061494 filed May 6, 2019, which claims priority to German Patent Application No. 102018112 846.0, the disclosure of which being incorporated herein by reference in their entireties.

FIELD

The primary area of use of the disclosed embodiments extends to rail vehicle construction. In particular, disclosed embodiments relate to a control device for controlling at least one actuator for actuating braking means for a rail vehicle.

SUMMARY

Disclosed embodiments relate to a control device for controlling at least one actuator for actuating braking means of a vehicle, more particularly of a rail vehicle, in which, proceeding from an actual value of a current brake pressure $p_B$ or a current contact force $F_B$, measured by means of a first sensor, of the at least one actuator for pressing against the braking means, a contact variable control system determines a manipulated variable for the at least one actuator in accordance with a setpoint value stipulated for this purpose, and in which, however also, proceeding from an actual value of a current deceleration force $F_V$ or a current deceleration torque $M_V$ at the braking means, which is measured by means of a second sensor, a braking torque control system determines a manipulated variable for the at least one actuator in accordance with a setpoint value stipulated for this purpose. The disclosed embodiments furthermore also relate to a rail vehicle having at least one car, which is equipped with a control device of this kind for brake actuation, and also relates to a method for operating the control device implementing a specific control process, which method can also be designed as a computer program product.

BRIEF DESCRIPTION OF THE FIGURES

Further measures that improve the disclosed embodiments are explained in greater detail below together with the description of illustrative embodiments with reference to the figures, of which:

FIG. 1 shows a schematic illustration of a rail vehicle consisting of a single car and having a control device arranged therein for controlling a plurality of actuators for actuating respectively associated braking means, FIG. 2 shows a schematic illustration of a rail vehicle consisting of a plurality of cars and having a control device arranged therein for controlling a plurality of actuators for actuating respectively associated braking means.

DETAILED DESCRIPTION

Figure 3:
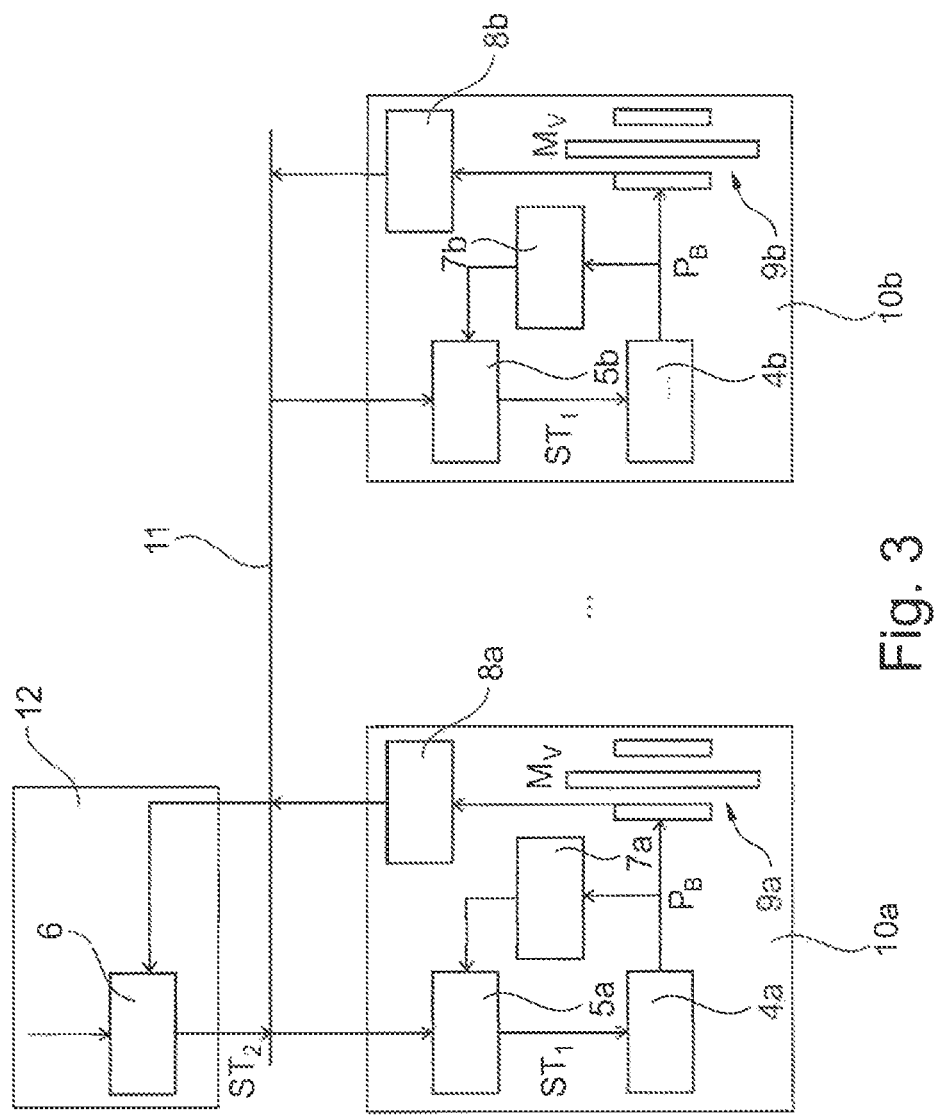
FIG. 3 shows a schematic block diagram of a cascaded control system, used as part of the control device, for braking torque control and contact variable control on different control levels.

The primary area of use of the disclosed embodiments extends to rail vehicle construction. Here, use is made of pneumatic, electromechanical or electromagnetic actuators which actuate the braking means of the vehicle, e.g. a disk brake. High safety requirements are imposed on brake actuation, and a braking process must be carried out in a reliably reproducible manner in accordance with a defined setpoint value stipulation. In order to satisfy these requirements, use is made in practice of brake control systems involving different control algorithms, primarily braking torque control or, alternatively, contact variable control.

In braking torque control, the effect of braking is ascertained by a braking torque sensor or braking force sensor which is arranged at the braking means, optionally the brake disk, and the measured value from which can likewise be converted, by way of the effective radius, into a braking torque. Control is performed in accordance with the braking torque produced.

In the case of contact variable control, in contrast, the contact force exerted on the braking means by the actuator or—especially in the case of pneumatic actuators—the current brake pressure, according to which control is exercised, is measured. Here too, the brake pressure is converted proportionally, by way of the effective area, into the currently acting contact force.

EP 2 890 596 discloses a control device of the type in question for controlling an actuator, which is here implemented in the form of a decentralized control architecture directly in the brake actuator. However, setpoint stipulation is performed from a central point, namely by way of brake control provided for each car. The control device arranged in a decentralized manner in the brake actuator comprises a setpoint value control device which, in accordance with the stipulated setpoint value of a deceleration variable $F_V$ or $M_V$, generates an actuating value for the actuator, which converts this actuating value into a contact variable. Downstream braking means convert this actual value of the contact variable, in turn, into a deceleration variable to brake the vehicle. As part of the control system, a first sensor is provided, which determines the actual value of the contact variable; a second sensor determines the actual value of the deceleration variable. The setpoint value control device is suitably designed for setting the actuating value in such a way for controlling the deceleration variable under predetermined operating conditions of the vehicle that the detected actual value of the deceleration variable corresponds to the setpoint value of the deceleration variable. Moreover, said setpoint value control device is also suitably designed for setting the actuating value in such a way for controlling the contact variable under further predetermined operating conditions of the vehicle—when said vehicle is stationary for example—that the detected actual value of the contact variable corresponds to a stipulated setpoint value thereof. Thus—depending on the operating conditions of the vehicle—the setpoint value control device arranged in a decentralized manner in the brake actuator carries out both braking torque control and contact variable control. In this prior art, there is thus active switching between contact variable and deceleration variable control at each brake actuator, depending on different operating conditions.

The disadvantage here is that the control variables processed or calculated by said setpoint value control device, e.g., the actual values determined by sensors and the respective actuating values for compensating the setpoint deviation which are calculated as part of the control process, cannot be bundled at a central point and made usable there, e.g. for the purpose of plausibility checks, effect monitoring actions and the like. Moreover, the computing capacity integrated into local brake actuators is often limited, and therefore complex control functions or the abovementioned additional functions cannot be carried out there. Moreover, if there is damage to the brake actuator, both control circuits, namely the braking torque control system and the contact variable control system, may be affected thereby and, in extreme cases, it would therefore only be possible to resort to an emergency braking function, which would be uncomfortable in comparison.

The presently disclosed embodiments further improve a control device of the type in question for controlling at least one actuator for actuating braking means of a vehicle or to further improve a method carried out thereby for operating said means in such a way that a wider range of functions and greater protection against failure can be achieved.

The disclosed embodiments include the technical teaching that a specific cascading control system is provided, in which the contact variable control system forms an inner control circuit, wherein the braking torque control system is arranged in a braking torque control unit embodied separately or in a separate location from the contact variable control unit and forms an outer control circuit. In this case, the outer control circuit carries out control of the at least one actuator in a manner which is prioritized over the inner control circuit, wherein furthermore the outer control circuit can be switched off under particular operating conditions of the vehicle, with the result that the inner control circuit automatically controls the at least one actuator.

In other words, the disclosed embodiments provide cascaded control that is not only subject to prioritization of the outer control circuit over the inner control circuit but also performs localized separation of the modules implementing the two control circuits. A high degree of protection against failure is thereby achieved in comparison with the prior art and it is not only the computing capacity of a single module that is burdened by the performance of the control functions, with the result that it may also be possible to carry out further additional control functions as part of the open-loop and closed-loop control architecture that forms the subject matter of the disclosed embodiments.

With the solution according to the disclosed embodiments, in normal operation of the vehicle, which includes a normal braking event, the outer control circuit is used to control the at least one actuator with priority over the inner control circuit. In normal operation, therefore, braking takes place under braking torque control. Under particular operating conditions of the vehicle, which also include particular driving states, the braking torque cannot be measured as an actual value for the braking torque control, however, e.g. when the vehicle is stationary. If such a case arises, the outer control circuit is switched off and, consequently, the inner control circuit automatically takes over control of the actuator, which performs contact variable control based on a measured value for the current brake pressure or for the contact force currently being exerted on the braking means, which value is normally always available. This is because these measured values can be determined even when the vehicle is stationary, for example.

According to a measure, for use of the inner control circuit, the braking torque control unit or the contact variable control unit may convert the setpoint value provided for prioritized braking torque control into a setpoint value suitable for contact variable control in order to ensure setpoint value stipulation for the inner control circuit when the outer control circuit is switched off. Separate setpoint value stipulation for the inner control circuit can thus be dispensed with.

To improve protection against failure, it is proposed that the braking torque control unit is arranged in such a way on a higher control level than the contact variable control unit that it is designed for use in conjunction with a plurality of contact variable control units on a lower control level. To this extent, there is no need for a 1:1 association between a braking torque control unit and a contact variable control unit, thus achieving a saving of expenditure on equipment required to implement the disclosed embodiments. The particular operating conditions of the vehicle or driving states that have already been discussed above, in which the braking torque control system is switched off in favor of the contact variable control system, is not restricted solely to the state of the vehicle in which it is stationary. Other conditions that are unsuitable for carrying out braking torque control, such as sliding of the vehicle or outputting of obviously incorrect control variables, e.g. implausible sensor measured values or manipulated variables outside expected ranges, can also lead to switching off of the braking torque control system, with the result that, as part of the cascaded control process, the inner control circuit automatically takes over control of the actuator by contact variable control.

According to another measure, it is proposed that additional control functions are performed, particularly in the braking torque control unit situated on the higher control level, comprising checking the plausibility of control variables, monitoring the effect of braking means actuation, data transfer to at least one other functional unit, e.g., to a braking force distributor unit, friction coefficient calculation unit or logging unit. Thus, it is possible to carry out plausibility checking of the measured braking torque values determined by sensors by comparison with the measured values from a plurality of contact variable control units. Monitoring of the effect of braking means actuation can be carried out in such a way that, for example, expected ranges of a braking travel are compared with the reality, and this can also be exploited for the purpose of monitoring wear. Moreover, further use of control variables by other functional units can take place in such a way that a braking force distributor unit provided as part of the brake system receives feedback information on locally achieved braking forces, or a friction coefficient calculation unit calculates the wheel-rail contact along the train on the basis of the measured sensor values, thus also making it possible to carry out an estimation of the effectiveness of restoration of the friction coefficient.

Through the implementation of such additional control functions on the higher control level, the limited computing capacity available locally on the lower control level is spared. Both the algorithm for braking torque control and the algorithm for contact variable control and any additional control functions provided can be implemented in the form of a computer program product with program code means, wherein the corresponding control software is optionally distributed between the contact variable control unit and the braking torque control unit, depending on the allocated function.

In principle, the control device according to the disclosed embodiments can operate at the actuator level, the wheelset level, the truck level, or the car level, although, according to a first exemplary embodiment, it is optionally envisaged that a contact variable control unit is provided for each actuator, for each wheelset or for each truck, and to this extent is close to the wheels, whereas at least one braking torque control unit is provided for each car. As an alternative, it is also possible for the at least one braking torque control unit to be provided more centrally, namely for each rail vehicle. In this case, the braking torque control unit is optionally arranged in the leading unit of the rail vehicle. In either case, however, the contact variable control of the inner control circuit takes place close to the wheels in the associated contact variable control unit.

It is also conceivable, in the context of the central controller unit arranged on the higher control level, for a plurality of braking torque controllers to run simultaneously.

According to FIG. 1, a rail vehicle consists of a single car 1, which is equipped with two trucks 2a and 2b, which each have two wheelsets 3a and 3b—here being indicated by way of example for truck 2a—to each of the wheels of which an actuator 4a and 4b, respectively, is assigned, which are used to actuate braking means—not denoted specifically here. In this illustrative embodiment, the illustrative actuators 4a and 4b are designed as pneumatic brake cylinders. The control device is described below for controlling the braking of truck 2a, but the description also applies analogously to the other truck 2b.

Each actuator 4a and 4b is assigned a contact variable control unit 5a and 5b, respectively, which to this extent is close to the wheels. A braking torque control unit 6 used in the context of cascaded control is provided centrally in the car 1. It is also possible here for a plurality of similarly equipped cars 1 to be connected to form a train.

Moreover, each contact variable control unit 5a and 5b is connected to a first sensor 7a and 7b, respectively, for measuring the actual value of the current brake pressure $p_B$ for an inner control circuit. In contrast, the braking torque control unit 6 is connected to a second sensor 8a and 8b, respectively, for measuring the deceleration torque $M_V$, currently being exerted at the wheels by the braking means, in order to implement the outer control circuit.

According to FIG. 2, a rail vehicle is formed from a plurality of cars 1a to 1c, wherein here a contact variable control unit 5a', 5b' close to the wheels is provided for each actuator 4a', 4b'. These are assigned a single braking torque control unit 6' for each rail vehicle, which is arranged in a car 1a serving as the leading unit. In other respects, this illustrative embodiment is analogous to the illustrative embodiment described above.

FIG. 3 illustrates the interaction of a plurality of inner control circuits, arranged in local controller units 10a, 10b, of a low control level with an outer control circuit, arranged substantially in a central controller unit 12, of a higher control level. This cascaded control system can be applied to the two illustrative embodiments of rail vehicles described above.

In the context of the first inner control circuit, the actuator 4a is a pneumatic brake cylinder, the contact force of which acts on braking means 9a in the form of a disk brake assembly known per se. In this case, first sensor 7a measures the actual value of the current brake pressure $p_B$ which the actuator 4a exerts for pressure on the braking means 9a. The measured value obtained by the first sensor 7a is fed as an actual value to an algorithm, stored in a contact variable control unit 5a, of a contact variable control system, which determines a manipulated variable $ST_1$ for the actuator 4a, i.e. a pressure increase or reduction to compensate for the control difference which arises, in accordance with a stipulated setpoint value. This contact variable control system of the contact variable control unit 5a forms the inner control circuit in the context of this cascaded control system.

In contrast, the outer control circuit is formed by a braking torque control system, which measures the current deceleration torque $M_V$ at the braking means 9a by means of a second sensor 8a and makes it available to a braking torque control unit 6. The braking torque control unit 6 is arranged on a higher control level than the inner control circuits 10a and 10b assigned to each wheel, and is connected thereto by a data bus line 11 for the purpose of bidirectional communication. To compensate the control difference, the braking torque control unit 6 determines a manipulated variable $ST_2$, which is provided in normal operation for the purpose of controlling the actuator 4a and is transmitted to the latter via the contact variable control unit 5a.

According to the function of cascaded control, the outer control circuit performs control of the actuator 4a or 4b with priority over the inner control circuit, wherein the outer control circuit, which is arranged remote from the wheels, can be switched off under particular operating conditions of the vehicle, with the result that the inner control circuit of each actuator 4a, 4b automatically takes over control.

In this illustrative embodiment, the centrally positioned braking torque control unit 6 of the higher control level is assigned to a plurality of contact variable control units 5a and 5b as a common outer control circuit.

The disclosed embodiments are not restricted to the illustrative embodiments described above. On the contrary, it is also possible to conceive of modifications thereof that are included within the scope of protection of the following claims. Thus, for example, it is also possible for a plurality of braking torque control algorithms to be embodied in parallel within a braking torque control unit and also for more than two local contact variable control units to be assigned to a central braking torque control unit. The solution according to the disclosed embodiments furthermore also allows architectures in which wheels of vehicles that are not arranged as part of a truck are brake-actuated.

LIST OF REFERENCE SIGNS 1 car
2 truck
3 wheelset
4 actuator
5 contact variable control unit
6 braking torque control unit
7 first sensor
8 second sensor
9 braking means
10 local controller unit
11 data bus line
12 central controller unit
$p_B$ actual value of the brake pressure
$F_B$ actual value of the contact force
$F_V$ actual value of the deceleration force
$M_V$ actual value of the deceleration torque
$ST_1$ manipulated variable of the contact variable control system
$ST_2$ manipulated variable of the braking torque control system
$S_V$ setpoint value for the braking torque control system
$S_B$ setpoint value for the contact variable control system

The invention claimed is:

1. A control device for controlling at least one actuator for actuating braking of a rail vehicle, wherein:
proceeding from an actual value of a current brake pressure or a current contact force, measured by a first sensor, of the at least one actuator for pressing against a braking means, a contact variable control system determines a manipulated variable for the at least one actuator in accordance with a stipulated brake pressure or contact force setpoint value, proceeding from an actual value of a current deceleration force or a current deceleration torque for braking measured by a second sensor, a braking torque control system determines a manipulated variable for the at least one actuator in accordance with a stipulated deceleration force or deceleration torque setpoint value, a cascaded control system is provided for contact variable control and braking torque control, in which the contact variable control system is arranged in a contact variable control unit and forms an inner control circuit, and the braking torque control system is arranged in a braking torque control unit embodied thereby and forms an outer control circuit, the outer control circuit carries out control of the at least one actuator in a manner which is prioritized over the inner control circuit, and the outer control circuit is configured to be switched off under predefined operating conditions of the vehicle, with the result that the inner control circuit controls the at least one actuator.

2. The control device of claim 1, wherein, to use the inner control circuit, the braking torque control unit or the contact variable control unit converts the setpoint value provided for braking torque control into a setpoint value for contact variable control to ensure setpoint value stipulation for the inner control circuit when the outer control circuit is switched off.

3. The control device of claim 1, wherein the braking torque control system is included in a braking torque control unit embodied separately or in a separate location from the contact variable control unit.

4. The control device of claim 3, wherein the braking torque control unit is included within a central controller unit, on a higher control level than the contact variable control unit, which is included in a local controller unit, wherein the braking torque control unit is configured for use in conjunction with a plurality of contact variable control units.

5. A rail vehicle having at least one car, in which at least two trucks, each having associated wheelsets, are arranged, wherein the wheels of which are assigned at least one actuator for brake actuation—by a control device as claimed in claim 1, wherein a contact variable control unit close to the wheels is provided for each actuator, each wheelset or each truck, whereas at least one braking torque control unit is provided for each car.

6. A rail vehicle having at least one car, in which at least two trucks, each having assigned wheelsets are arranged, wherein the wheels of which are assigned at least one actuator for brake actuation by a control device as claimed in claim 1, wherein a contact variable control unit close to the wheels is provided for each actuator, each wheelset or each truck, whereas at least one braking torque control unit—is provided for each rail vehicle, which control unit is arranged in the leading unit of the rail vehicle.

7. A method for operating a control device having a cascaded control system, of claim 1, the method comprising:
in normal operation of a vehicle, an outer control circuit is used to control at least one actuator with priority over the inner control circuit;
under predefined operating conditions of the vehicle, the outer control circuit is switched off; and
with the outer control circuit switched off, an inner control circuit is used automatically to control the actuator.

8. The method of claim 7, wherein for use of the inner control circuit, a setpoint value provided for braking torque control is converted into a setpoint value for contact variable control to ensure setpoint value stipulation for the inner control circuit when the outer control circuit is switched off.

9. The method of claim 7, wherein the predefined operating conditions of the vehicle are selected from a group of conditions unsuitable for carrying out braking torque control, the group comprising:
standstill of the vehicle,
sliding of the vehicle,
output of incorrect control variables.

10. The method of claim 7, wherein additional control functions are performed by a central controller unit situated on the higher control level and containing a braking torque control unit, the method comprising:
checking the plausibility of control variables,
monitoring the effect of braking means actuation, and
data transfer of control variables to at least one other functional unit comprising a braking force distributor unit, friction coefficient calculation unit, logging unit.

11. A non-transitory computer program product with program code modules for carrying out a method for operating a control device having a cascaded control system when the computer program code runs on a contact variable control unit and a braking torque control unit of the control device of claim 1, wherein the method comprises:
in normal operation of a vehicle, an outer control circuit is used to control at least one actuator with priority over the inner control circuit;
under predefined operating conditions of the vehicle, the outer control circuit is switched off; and
with the outer control circuit switched off, an inner control circuit is used automatically to control the actuator.

* * * * *